US008750932B2

(12) United States Patent
Zeira et al.

(10) Patent No.: US 8,750,932 B2
(45) Date of Patent: Jun. 10, 2014

(54) METHOD AND APPARATUS FOR PROTECTING HIGH THROUGHPUT STATIONS

(75) Inventors: Eldad M. Zeira, Huntington, NY (US);
Stephen E. Terry, Northport, NY (US);
Joseph S. Levy, Merrick, NY (US);
Sudheer A. Grandhi, Mamaroneck, NY (US); Arty Chandra, Manhasset Hills, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 217 days.

(21) Appl. No.: 11/531,006

(22) Filed: Sep. 12, 2006

(65) Prior Publication Data

US 2007/0076752 A1    Apr. 5, 2007

Related U.S. Application Data

(60) Provisional application No. 60/717,079, filed on Sep. 14, 2005.

(51) Int. Cl.
*H04M 1/00*    (2006.01)

(52) U.S. Cl.
USPC ............... 455/562.1; 455/456.1; 370/338; 370/252

(58) Field of Classification Search
USPC ......... 370/231, 320, 335–337, 342–349, 389, 370/395, 468, 522, 203, 338, 328, 311, 312, 370/334, 252; 375/130, 141, 150, 260, 295; 455/450, 517, 296, 101, 562.1, 456.1
See application file for complete search history.

(56) References Cited

U.S. PATENT DOCUMENTS

| 6,442,145 B1 | 8/2002 | De Lange et al. |
| 7,221,681 B2 | 5/2007 | Choi et al. |

(Continued)

FOREIGN PATENT DOCUMENTS

| EP | 1168670 A2 | 1/2002 |
| WO | 2004/064306 | 7/2004 |

(Continued)

OTHER PUBLICATIONS

Abraham et. al.,802.11n MAC Design and System Performance, Communication, 2005. ICC 2005. 2005 IEEE international Conference on , vol. 5, May 16-20, 2005 pp. 2957-2961.*

(Continued)

*Primary Examiner* — Mahendra Patel
(74) *Attorney, Agent, or Firm* — Volpe and Koeing, P.C.

(57) ABSTRACT

A method and apparatus for protecting high throughput (HT) stations (STAs) are disclosed. In one embodiment, a physical layer (PHY) legacy preamble transmitted by one STA is decoded by another STA that does not use a legacy preamble. In another embodiment, one STA is identified by another STA by using bits in the preamble of a packet to indicate which PHY type will be used in the remaining portion of the packet. In yet another embodiment, one STA sends ready-to-send (RTS)/clear-to-send (CTS) or CTS-to-self messages for reserving a medium in the presence of another STA of a different type than the one STA. In yet another embodiment, an access point (AP) transmits a beacon or an association message including a capability information element (IE) that indicates operation or support for a legacy preamble, HT STA preambles and a medium access control (MAC) packet transmission with HT protection mechanisms.

20 Claims, 3 Drawing Sheets

(56) References Cited

U.S. PATENT DOCUMENTS

| | | | |
|---|---|---|---|
| 7,362,735 B2 | 4/2008 | Mantha | |
| 8,081,986 B2 * | 12/2011 | Park et al. | 455/456.1 |
| 8,098,616 B2 | 1/2012 | Kishigami et al. | |
| 2004/0002364 A1 * | 1/2004 | Trikkonen et al. | 455/562.1 |
| 2004/0179467 A1 * | 9/2004 | Seeger et al. | 370/203 |
| 2005/0113026 A1 | 5/2005 | Moorti et al. | |
| 2005/0136933 A1 | 6/2005 | Sandhu et al. | |
| 2005/0181800 A1 | 8/2005 | Trachewsky et al. | |
| 2006/0039341 A1 * | 2/2006 | Ptasinski et al. | 370/338 |
| 2006/0142004 A1 * | 6/2006 | He et al. | 455/434 |
| 2006/0159003 A1 * | 7/2006 | Nanda et al. | 370/203 |
| 2006/0218459 A1 * | 9/2006 | Hedberg | 714/752 |
| 2006/0227801 A1 * | 10/2006 | Nanda et al. | 370/447 |
| 2006/0252386 A1 * | 11/2006 | Boer et al. | 455/101 |
| 2007/0041458 A1 * | 2/2007 | Hocevar et al. | 375/260 |
| 2007/0183515 A1 * | 8/2007 | Lim et al. | 375/260 |

FOREIGN PATENT DOCUMENTS

| | | | |
|---|---|---|---|
| WO | 2005/006700 | 1/2005 | |
| WO | 2005/039105 | 4/2005 | |
| WO | 2005/039127 | 4/2005 | |
| WO | 2005/039133 | 4/2005 | |
| WO | 2005/081424 | 9/2005 | |
| WO | 2005/083902 | 9/2005 | |
| WO | WO 2005083902 A1 * | 9/2005 | H04B 7/06 |

OTHER PUBLICATIONS

Lui et. al., A Cooperative MAC Protocol for Wireless Local Area Networks, Communication, 2005. ICC 2005. 2005 IEEE international Conference on , vol. 3 5, May 16-20, 2005, pp. 2962-2968.*

Nanda et. al.,A High-Perfomance MIMO OFDM Wireless LAN, IEEE Communciation Magazine, Feb. 2005, vol. 43 No. 2, pp. 101-109.*

IEEE P802.11n/D1.0, Draft Amendment to Standard [for] Information Technology—Telecommunications and Information Exhange Between System—Local and Metropolitan Networks—Specific Requirements—Part 11: Wireless LAN Medium Access Control (MAC) and Physical Layer (PHY) Specifications: Enhancements for Higher Throughput, Mar. 2006.

Gast, Matthew. "802.11 Wireless Networks: The Definitive Guide, Second Edition." Apr. 2005, pp. 311-342. http://www.oreilly.com/catalog/802dot112/.

Tarokh et al., "Space-Time Block Codes from Orthogonal Designs," IEEE Transactions on Information Theory, vol. 45, No. 5, pp. 1456-1467 (Jul. 1999).

Abraham et al., "802.11n MAC Design and System Performance," IEEE International Conference on Communication, vol. 5, pp. 2957-2961 (May 16-20, 2005).

Gast, M., "802.11 Wireless Networks: The Definitive Guide, Second Edition," XP002414302, Apr. 2005, Chapter 15, pp. 311-342, http://www.oreilly.com/catalog/802dot112.

IEEE P802.11n/D1.0, Draft Amendment to Standard [For] Information Technology—Telecommunications and Information Exchange Between System—Local and Metropolitan Networks—Specific Requirements—Part 11: Wireless LAN Medium Access Control (MAC) and Physical Layer (PHY) Specifications: Enhancements for Higher Throughput, Mar. 2006.

IEEE P802.11n/D1.04, Draft Amendment to Standard [For] Information Technology—Telecommunications and Information Exchange Between System—Local and Metropolitan Networks—Specific Requirements—Part 11: Wireless LAN Medium Access Control (MAC) and Physical Layer (PHY) Specifications: Enhancements for Higher Throughput, Oct. 2006.

IEEE Wireless LAN Edition, A Compilation Based on IEEE Std 802.11-1999 (R2003) and Its Amendments.

Liu et al., "A Cooperative MAC Protocol for Wireless Local Area Networks," IEEE International Conference on Communication, vol. 5, pp. 2962-2968 (May 16-20, 2005).

Nanda et al., A High Perfomance MIMO OFDM Wireless LAN, IEEE Communication Magazine, vol. 43, No. 2, pp. 101-109 (Feb. 2005).

Vassis et al., "The IEEE 802.11g Standard for High Data Rate WLANs," IEEE Network, vol. 19, Issue 3, pp. 21-26 (May/Jun. 2005).

Nanda et al., A High-Perfomance MIMO OFDM Wireless LAN, IEEE Communication Magazine, vol. 43, No. 2, pp. 101-109 (Feb. 2005).

* cited by examiner

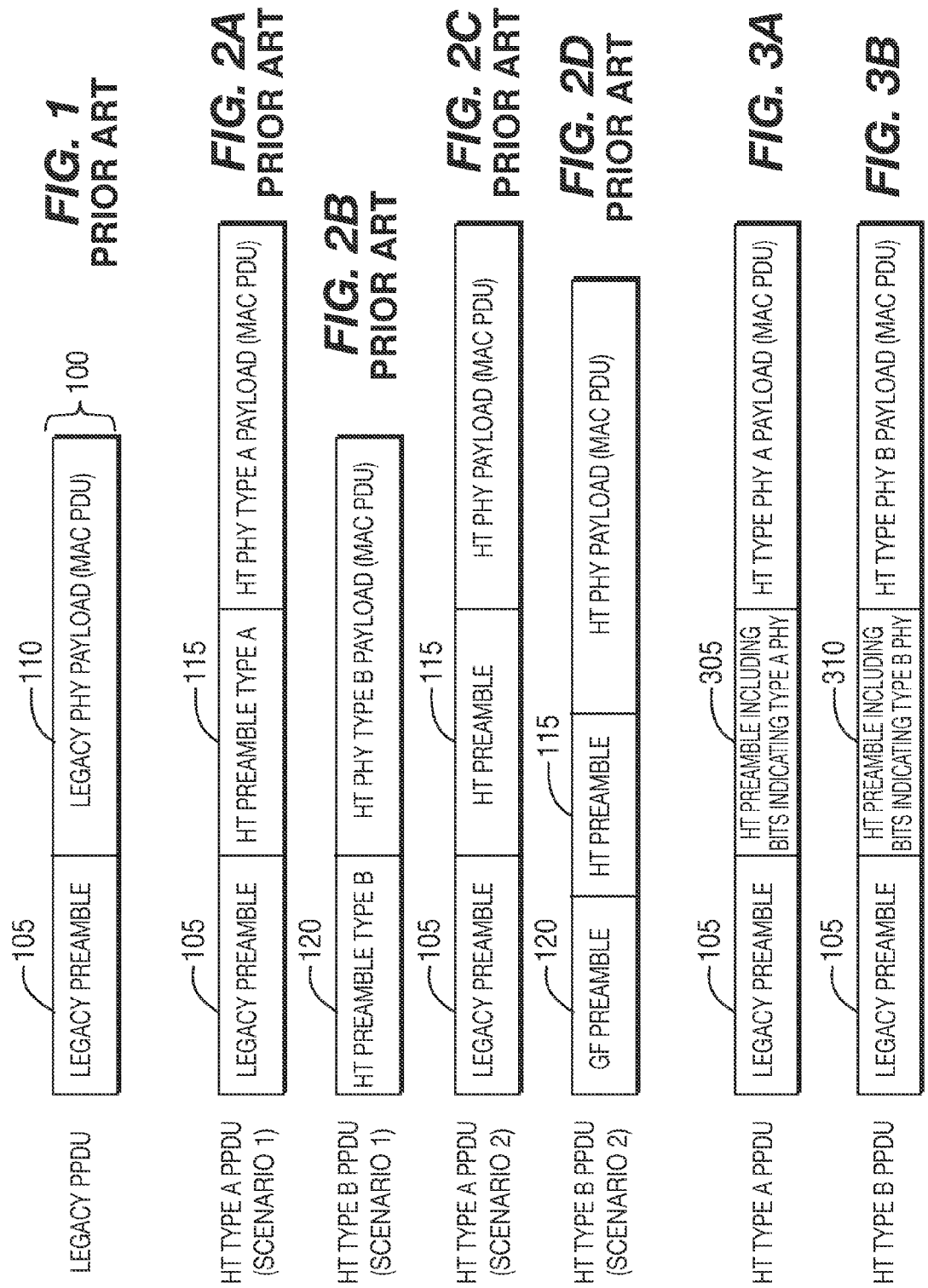

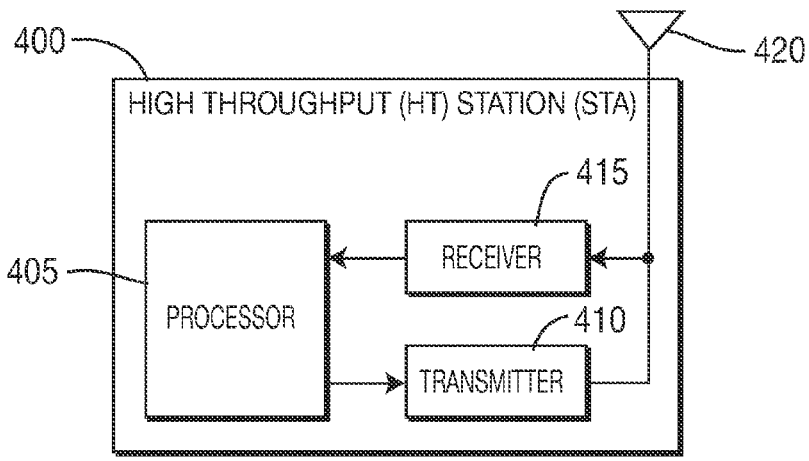
FIG. 4
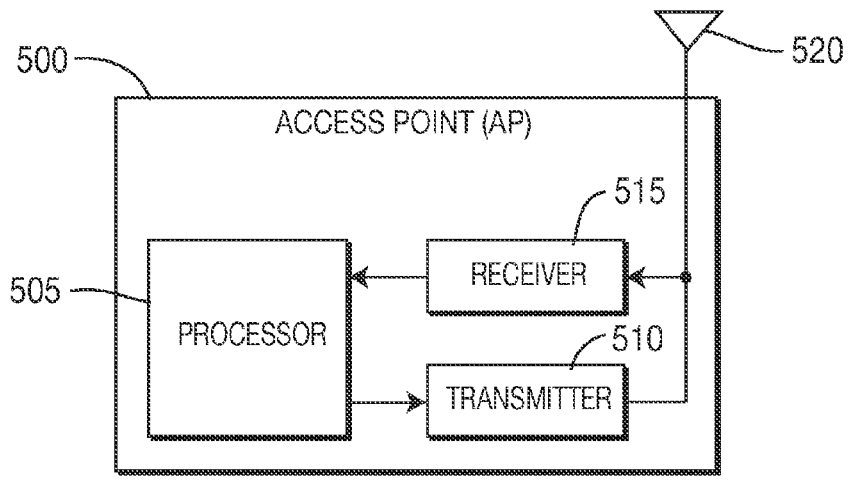
FIG. 5
| ELEMENT ID | LENGTH | LSIG TXOP PROTECTION FOR HT PHY TYPE A | LSIG TXOP PROTECTION FOR HT PHY TYPE B | HT PHY TYPE B SUPPORT | HT PHY TYPE B PROTECTION WITH RTS/CTS OR CTS-TO-SELF | GF PROTECTION WITH RTS/CTS OR CTS-TO-SELF |
FIG. 6

METHOD AND APPARATUS FOR PROTECTING HIGH THROUGHPUT STATIONS

CROSS REFERENCE TO RELATED APPLICATION

This application claims the benefit of U.S. Provisional Application No. 60/717,079 filed Sep. 14, 2005, which is incorporated by reference as if fully set forth.

FIELD OF INVENTION

The present invention relates to wireless communication systems. More particularly, the present invention is related to the protection of high throughput (HT) transmissions in the presence of other incompatible HT transmissions and legacy transmissions.

BACKGROUND

HT transmissions need protection from legacy stations (STAs), since legacy STAs using contention will not be able to decipher HT physical layer (PHY) packet data units (PPDUs), and thus the legacy STAs may not interpret the medium as being busy. Similarly, HT transmissions of a given HT STA require protection from other HT STAs in the case where the HT PHYs are incompatible.

As shown in FIG. 1, each legacy PPDU 100 comprises a legacy PHY preamble/header 105 followed by a legacy PHY payload 110, which is typically a medium access control (MAC) packet data unit (PDU). As an example, FIGS. 2A and 2B show that an HT device (i.e., Type A) and another HT device (i.e., Type B) have different PHY preambles 115, 120. The Type A device has both a legacy preamble 105 as well as a new preamble 115 for MIMO capability as part of a PHY header, whereas, the Type B device only has a new PHY preamble 120. However, the Type B device can decode the legacy preamble 105. The HT PHY preambles 115, 120 of both the Type A and B devices are different. In this case, the two devices will not be able to communicate with each other. Also, the Type A device is inefficient in absence of any legacy devices. Two considered scenarios (1 and 2) are described below.

Scenario 1 uses at least three different types of devices which operate with different/incompatible PHY layers: 1) legacy devices which transmit packets with only a legacy preamble 105, as shown in FIG. 1; 2) HT Type A devices which transmit PPDUs with Type A HT preambles 115, as shown in FIG. 2A; and 3) HT Type B devices which transmit PPDUs with Type B HT preambles 120, as shown in FIG. 2B.

Scenario 2 also uses at least three types of devices: 1) legacy devices which transmit packets with just a legacy preamble 105, as shown in FIG. 1; 2) HT devices which transmit mixed-mode packets, (e.g., a PHY preamble comprising a legacy preamble and an HT preamble), as shown in FIG. 2C; and 3) HT devices which transmit packets with just HT PHY preambles, (i.e., a Green Field (GF) PHY preamble 120 and HT preamble 115), as shown in FIG. 2D.

Thus, different types of HT devices may operate using mutually incompatible PHY layers. For example, the receiver of a first type of HT STA may not be able to decode packets transmitted by a second type of HT STA, and vice versa.

SUMMARY

The present invention proposes enhancements that provide HT and legacy inter-working solutions for different schemes implemented in a wireless communication network including a plurality of STAs, such as those schemes used in IEEE 802.11n, or the like. The interworking solutions include MAC and PHY layer protection mechanisms, preamble signaling, and beacon signaling. In one embodiment, a first type of HT STA is identified by a second type of HT STA by using bits in the preamble of a packet to indicate which PHY type will be used in the remaining portion of the packet.

In another embodiment, a second type of HT STA sends ready-to-send (RTS)/clear-to-send (CTS) or CTS-to-self for reserving the medium in the presence of a first type of HT STA. In yet another embodiment, legacy preamble protection is used by different types of HT STAs for protecting their transmissions. In yet another embodiment, an access point indicates operation or support in a system for a legacy preamble using a beacon or an association message.

BRIEF DESCRIPTION OF THE DRAWINGS

A more detailed understanding of the invention may be had from the following description, given by way of example and to be understood in conjunction with the accompanying drawings wherein:

FIG. 1 illustrates a conventional legacy PPDU which includes a legacy preamble and a legacy PHY payload;

FIGS. 2A and 2B illustrate a first conventional scenario (Scenario 1) in which HT Type A and HT Type B devices operate with different and incompatible physical layers;

FIGS. 2C and 2D illustrate a second conventional scenario (Scenario 2) in which HT devices transmit mixed-mode packets and/or packets with only HT PHY preambles;

FIGS. 3A and 3B illustrate PPDU structures which use an HT preamble including bits which indicate the HT type of a PHY payload in accordance with the present invention;

FIG. 4 is a block diagram of a STA configured to receive, decipher and transmit protected HT transmissions using a legacy preamble in accordance with the present invention;

FIG. 5 is a block diagram of an AP configured to transmit a beacon or association message which include a capability information element (IE) in accordance with the present invention;

FIG. 6 shows the fields of the capability IE included in the beacon or association message transmitted by the AP of FIG. 5.

DETAILED DESCRIPTION OF THE PREFERRED EMBODIMENTS

Figure 7:
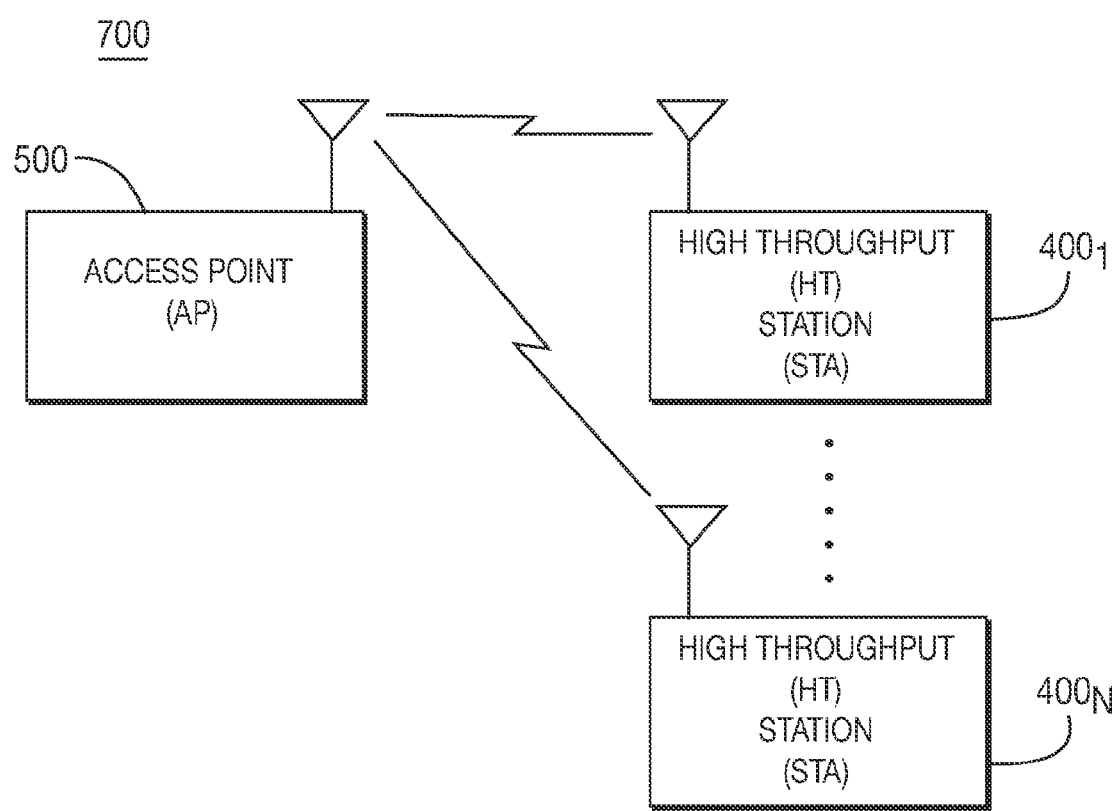
FIG. 7 shows a wireless communication system including the AP of FIG. 5 and a plurality of HT STAs similar to the HT STA of FIG. 4.

When referred to hereafter, the terminology "STA" includes but is not limited to a wireless transmit/receive unit (WTRU), a user equipment (UE), a mobile station, a fixed or mobile subscriber unit, a pager, or any other type of device capable of operating in a wireless environment. When referred to hereafter, the terminology "access point (AP)" includes but is not limited to a base station, a Node-B, a site controller or any other type of interfacing device in a wireless environment.

The features of the present invention may be incorporated into an integrated circuit (IC) or be configured in a circuit comprising a multitude of interconnecting components.

The present invention allows the interoperability of HT devices which operate using different/incompatible PHY layers such as those previously described with respect to Scenario 1 and/or Scenario 2, as shown in FIGS. 1 and 2. MAC and PHY level protection techniques are used to resolve the interoperability problems introduced by incompatible PHY payloads. In addition, signaling in the HT preamble is implemented to facilitate interoperability. Finally, beacon signaling is used to help support the interoperability features.

In one embodiment illustrated by FIGS. 3A and 3B, a preamble structure of a PPDU, (i.e., packet), is used for both HT STAs of Type A and B, whereby the HT preambles include bits indicating which PHY payload Type will be used in remaining portion of the packet. Each of the HT STAs is able to decode the legacy preamble 105 using a receiver configured to decode the PHY preamble which is sent at a basic rate/modulation. The HT PHY preamble provides information about the modulation and coding scheme (MCS) or PHY payload type used for the remaining portion of the packet. However, it may not be possible to decode the remaining portion of the packet since the PHY layer transmission is incompatible, (e.g., space-time block code (STBC) transmissions are not compatible with non-STBC PHY transmissions). The first HT STA will not have a problem in decoding both the PHY preambles. However, the second HT STA will be able to decode the legacy preamble and the bit indicating the PHY payload type used for the remaining portion, (i.e., payload), of the packet.

The second HT STA will be able to decode the rest of the packet. However, even if the rest of the packet is not decoded, the second HT STA will extract sufficient information from the legacy PHY preamble to set its NAV timer for the remainder of the transmission. Also, in this embodiment, the first HT STA is able to identify the second HT STA preamble based on certain bits in the PEY preamble, and decode the remainder of the packet.

In a MAC level protection mechanism, MAC layer signaling is used to set a network allocation vector (NAV), which is a MAC level carrier-sense procedure. The MAC signaling could be implemented by using RTS/CTS or CTS-to-self mechanisms before transmission, to set the NAV in the system, or by simply appropriately setting a duration field in the MAC header of a transmitted packet.

In a PHY level protection mechanism, the legacy PHY layer convergence procedure (PLCP) rate and length fields in a legacy signal field are set to indicate a desired duration for protection. The legacy signal field precedes the HT part of the PPDU. The legacy signal field is transmitted using an omnidirectional antenna pattern and a legacy MCS such that it may be received by all STAs. This method of protection is called legacy signal (L-SIG) field transmit opportunity (TXOP) protection.

In a second embodiment (applying to Scenario 1 and scenario 2), the second HT STA (HT Type B device) sends RTS/CTS or CTS-to-self for reserving the medium in the presence of the first HT STA, (HT Type A device).

In another embodiment (applied to both Scenarios 1 & 2), a preferable network AP supports a legacy preamble, the HT STA preambles and a MAC packet transmission with HT protection mechanisms according to the above proposed methods. Alternatively, if the AP does not support the HT STAs, it indicates this information in a beacon or in an association message. Hence, the HT STAs operate in legacy mode using a legacy preamble.

The legacy signal field, (PLCP rate and length fields), may be used to indicate the entire period for protection, and may be sent aperiodically when required. The legacy preamble can be sent with and without an actual MAC packet following it. This does not require sending the legacy signal field with every packet in the protected duration. This also avoids the overhead of transmitting legacy packets, (MAC level), for protection of HT transmissions. Furthermore, the first HT STA, (HT STA type A of Scenario 1), does not send the PHY preamble in the absence of legacy station. The information sent on the beacon can be used by the first HT STA of Type A as in Scenario 1 to find out whether there are legacy STAs in the network.

FIG. 4 is a block diagram of an HT STA 400 configured to receive, decipher and transmit HT transmissions using a legacy preamble in accordance with the present invention. The HT STA 400 includes a processor 405, a transmitter 410, a receiver 415 and an antenna 420 electrically coupled to the transmitter 410 and the receiver 415. The processor 405 is configured to generate and decipher protected HT transmissions in accordance with the present invention, whereby a legacy preamble precedes the HT transmissions having a preamble with bits indicating the PHY payload type.

FIG. 5 is a block diagram of an AP 500 configured to protect HT transmissions using a legacy preamble in accordance with the present invention. The AP 500 includes a processor 505, a transmitter 510, a receiver 515 and an antenna 520 electrically coupled to the transmitter 510 and the receiver 515. The processor 505 is configured to generate a beacon or an association message for transmission by the transmitter 510 via the antenna 520. The beacon or association message may include information which indicates operation or support for a legacy preamble, HT STA preambles and a MAC packet transmission with HT protection mechanisms according to the above proposed methods.

FIG. 6 shows the fields of a capability Information Element (IE) included in the beacon or association message transmitted by the AP 500 which indicate support for the HT protection mechanisms. The order of the fields is not significant and can be arbitrarily specified for a given implementation. The fields may be included in a new capability IE, or added to existing capability IEs.

FIG. 7 shows a wireless communication system 700 including the AP 500 of FIG. 5 and a plurality of HT STAs 400$_1$-400$_N$, similar to the HT STA 400 (PHY Type B) of FIG. 4. If HT PHY Type B protection with an RTS/CTS or CTS-to-self subfield indicates support of this mechanism in beacons transmitted by the AP 500, one of the HT STAs 400 may start a FXOP by transmitting an RTS message to the AP 500. The AP 500 then responds to the RTS message by transmitting a CTS message. The HT STA 400 and the AP 500 may also use a CTS-to-self message for protecting HT transmissions of PHY Type B.

Although the features and elements of the present invention are described in the preferred embodiments in particular combinations, each feature or element can be used alone (without the other features and elements of the preferred embodiments) or in various combinations with or without other features and elements of the present invention.

What is claimed is:

1. An access point (AP) comprising:
   a processor configured to generate an association message, wherein the association message includes a high throughput (HT) capability information element (IE) that indicates support for a legacy signal (L-SIG) transmit opportunity (TXOP) protection mechanism and support for a space-time block code (STBC) modulated transmission, wherein the L-SIG TXOP protection mechanism includes setting a length field and a rate field associated with an L-SIG field to indicate a desired duration for protection;
   an antenna; and
   a transmitter configured to transmit the association message via the antenna.

2. An access point (AP) comprising:
a processor configured to generate a beacon, wherein the beacon includes a high throughput (HT) capability information element (IE) that indicates support for a legacy signal (L-SIG) transmit opportunity (TXOP) protection mechanism and support for a space-time block code (STBC) modulated transmission, wherein the L-SIG TXOP protection mechanism includes setting a length field and a rate field associated with an L-SIG field to indicate a desired duration for protection;
an antenna; and
a transmitter configured to transmit the beacon via the antenna.

3. A high throughput (HT) station (STA) comprising:
a transmitter configured to transmit a first association message; and
a receiver configured to receive a second association message that includes a high throughput (HT) capability information element (IE) that indicates support for a legacy signal (L-SIG) transmit opportunity (TXOP) protection mechanism and support for a space-time block code (STBC) modulated transmission, wherein the L-SIG TXOP protection mechanism includes setting a length field and a rate field associated with an L-SIG field to indicate a desired duration for protection.

4. The STA of claim 3, wherein the first association message is an association request message.

5. The STA of claim 3, wherein the first association message is an association response message.

6. A method for use in an access point (AP), the method comprising:
generating an association message that includes a high throughput (HT) capability information element (IE) that indicates support for a legacy signal (L-SIG) transmit opportunity (TXOP) protection mechanism and support for a space-time block code (STBC) modulated transmission, wherein the L-SIG TXOP protection mechanism includes setting a length field and a rate field associated with an L-SIG field to indicate a desired duration for protection; and
transmitting the association message to a station (STA).

7. The method of claim 6, wherein the association message is an association response message.

8. The method of claim 6 further comprising:
receiving an association request message.

9. A method for use in an access point (AP), the method comprising:
generating a beacon that includes a high throughput (HT) capability information element (IE) that indicates support for a legacy signal (L-SIG) transmit opportunity (TXOP) mechanism and support for a space-time block code (STBC) modulated transmission, wherein the L-SIG TXOP protection mechanism includes setting a length field and a rate field associated with an L-SIG field to indicate a desired duration for protection; and
transmitting the beacon to a station (STA).

10. The method of claim 9 further comprising:
receiving an association response message in response to the beacon.

11. A method for use in a high throughput (HT) station (STA), the method comprising:
transmitting a first association message; and
receiving a second association message that includes an HT capability information element (IE) that indicates support for a legacy signal (L-SIG) transmit opportunity (TXOP) protection mechanism and support for a space-time block code (STBC) modulated transmission, wherein the L-SIG TXOP protection mechanism includes setting a length field and a rate field associated with an L-SIG field to indicate a desired duration for protection.

12. The method of claim 11, wherein the first association message is an association request message.

13. The method of claim 11, wherein the second association message is an association response message.

14. The AP of claim 1, wherein the association message is an association request message.

15. A method for use in a high throughput (HT) station (STA), the method comprising:
receiving a beacon, from an access point (AP), that includes an HT capability information element (IE) that indicates support for a legacy signal (L-SIG) transmit opportunity (TXOP) protection mechanism and support for a space-time block code (STBC) modulated transmission, wherein the L-SIG TXOP protection mechanism includes setting a length field and a rate field associated with an L-SIG field to indicate a desired duration for protection.

16. The method of claim 15 further comprising:
transmitting an association message in response to the beacon.

17. The method of claim 16, wherein the association message is an association request message.

18. A high throughput (HT) station (STA) comprising:
a receiver configured to receive a beacon, from an access point (AP), that includes an HT capability information element (IE) that indicates support for a legacy signal (L-SIG) transmit opportunity (TXOP) protection mechanism and support for a space-time block code (STBC) modulated transmission, wherein the L-SIG TXOP protection mechanism includes setting a length field and a rate field associated with an L-SIG field to indicate a desired duration for protection.

19. The STA of claim 18 further comprising:
a transmitter configured to transmit an association message in response to the beacon.

20. The STA of claim 19, wherein the association message is an association request message.

* * * * *